(12) United States Patent
Stone et al.

(10) Patent No.: US 10,920,126 B2
(45) Date of Patent: Feb. 16, 2021

(54) DEGRADABLE OBJECT

(71) Applicants: Matthew Stone, Humble, TX (US);
Colin Andrew, Cypress, TX (US);
John Wakefield, Cypress, TX (US);
Jeffery Alldaffer, Montgomery, TX (US)

(72) Inventors: Matthew Stone, Humble, TX (US);
Colin Andrew, Cypress, TX (US);
John Wakefield, Cypress, TX (US);
Jeffery Alldaffer, Montgomery, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 50 days.

(21) Appl. No.: 16/109,452

(22) Filed: Aug. 22, 2018

(65) Prior Publication Data

US 2020/0063016 A1 Feb. 27, 2020

(51) Int. Cl.
*C09K 8/516* (2006.01)
*E21B 29/02* (2006.01)
*E21B 33/12* (2006.01)

(52) U.S. Cl.
CPC .............. *C09K 8/516* (2013.01); *E21B 29/02* (2013.01); *E21B 33/12* (2013.01)

(58) Field of Classification Search
None
See application file for complete search history.

(56) References Cited

U.S. PATENT DOCUMENTS

| | | | | |
|---|---|---|---|---|
| 6,162,766 A | * | 12/2000 | Muir | C09K 8/62 507/267 |
| 2004/0014607 A1 | * | 1/2004 | Sinclair | C09K 8/516 507/200 |
| 2009/0264321 A1 | * | 10/2009 | Showalter | C09K 8/512 507/219 |
| 2016/0075941 A1 | * | 3/2016 | Duenckel | C09K 8/805 166/280.2 |
| 2016/0369592 A1 | * | 12/2016 | Aitken | E21B 34/063 |
| 2017/0121596 A1 | * | 5/2017 | Canova | C09K 8/805 |

* cited by examiner

*Primary Examiner* — John J Figueroa
(74) *Attorney, Agent, or Firm* — Cantor Colburn LLP

(57) ABSTRACT

A degradable object including a shell comprising a degradable material, a substance disposed at least partially within the shell, the substance having a coefficient of thermal expansion greater than a coefficient of thermal expansion of the shell.

17 Claims, 3 Drawing Sheets

DEGRADABLE OBJECT

BACKGROUND

In the resource recovery industry, objects such as tripping balls are employed to initiate all manner of differential pressure mediated operations. The objects are landed on seats against which they form a substantial seal and allow the application of pressure to a combination of the object and the seat. Tripping balls have been used for decades and work quite well at least for the initial phase of operations where the balls are landed and pressured against. They can become less desirable after this phase since generally they are in the way after the operation for which the ball was introduced is completed. Removal of balls has traditionally been done with reverse circulation and more recently through the use of degradable balls but timing of the degradation is less than ideal. Accordingly, the art would well receive developments that provide greater timing in degradation of such objects.

SUMMARY

A degradable object including a shell comprising a degradable material, a substance disposed at least partially within the shell, the substance having a coefficient of thermal expansion greater than a coefficient of thermal expansion of the shell.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
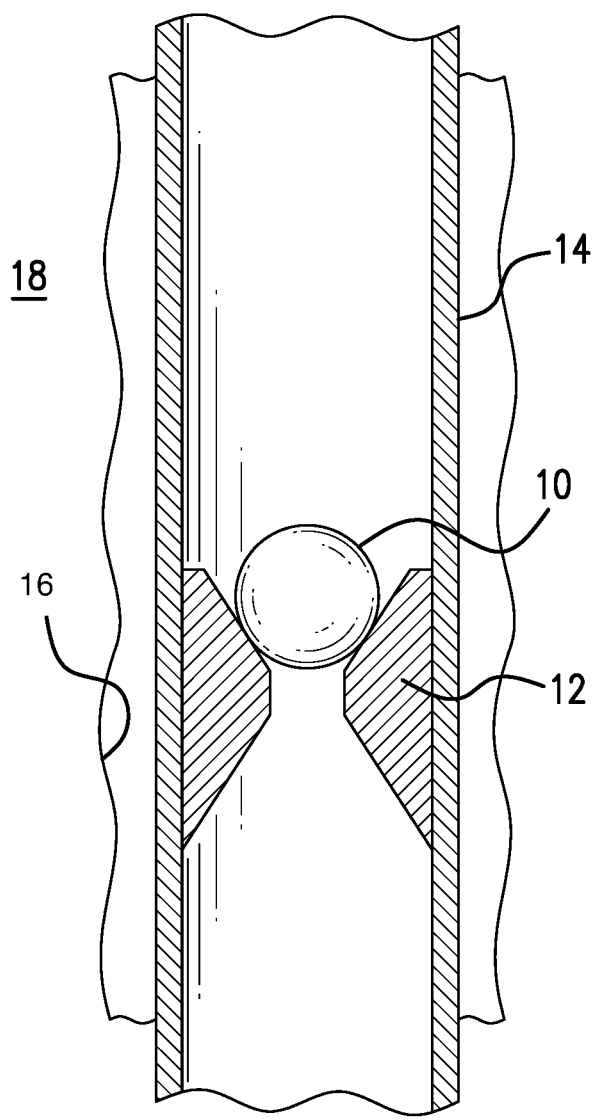
FIG. 1 is a schematic representation of a borehole with a seat therein and an object landed on the seat.

FIG. 1 is a schematic figure intended to provide one possible environment for the degradable object as disclosed herein. FIG. 1 illustrates an object 10 landed on a seat 12 disposed within a tubular string 14 in a borehole 16 in a subsurface formation 18. The environment of FIG. 1 may be a hydrocarbon well where the object is landed on seat 12 to perform a pressure based operation such as a fracturing operation in the well to enhance production therefrom. One of ordinary skill in the art will understand the overall construct such that further detail thereon is not needed.

Figure 2:
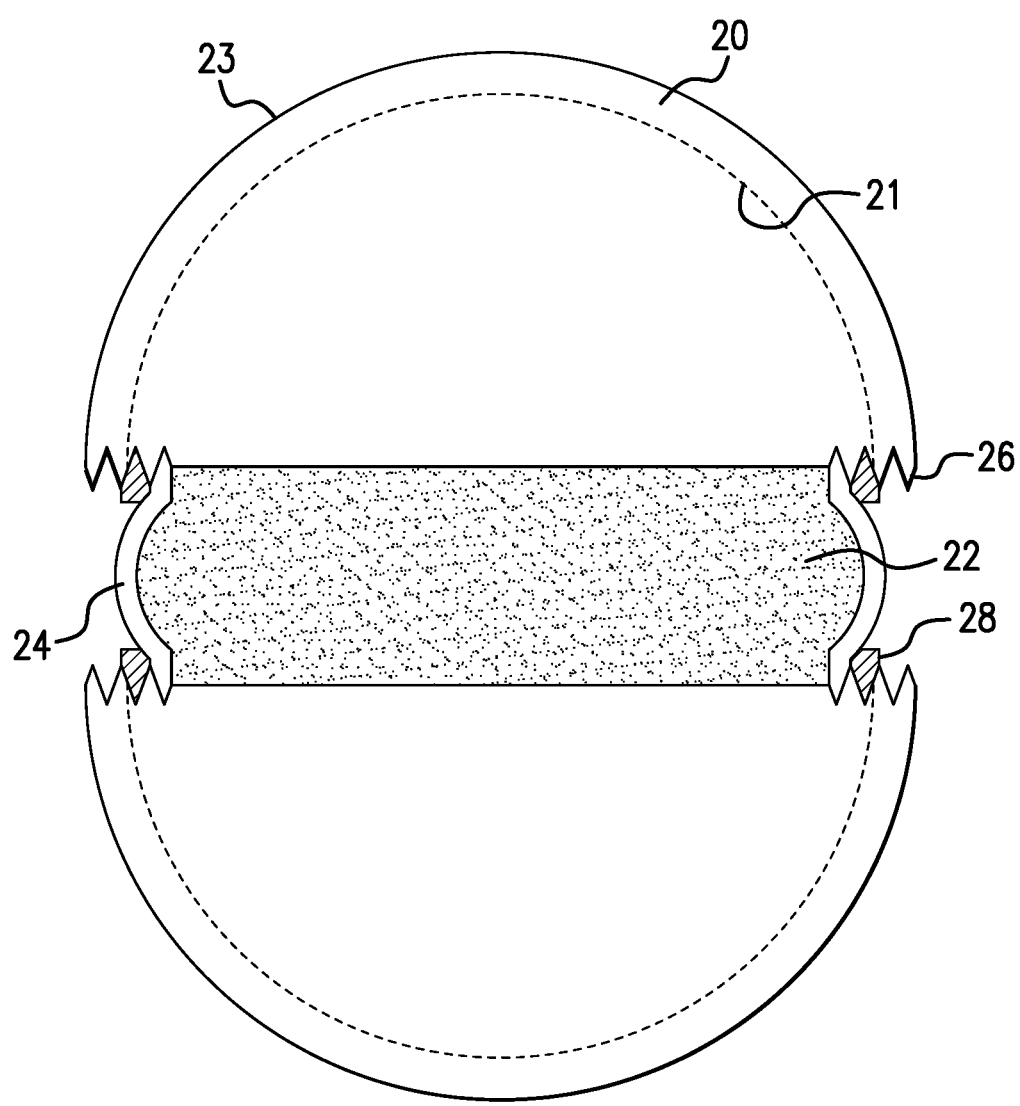
FIG. 2 is an exploded view of the object of FIG. 1, illustrating an embodiment as disclosed herein.

Referring to FIG. 2, an embodiment of a degradable object 10 is illustrated. The object 10 is configured with an outer shell 20 and a substance 22 that may be a liquid or a solid disposed within the shell 20, the substance having a coefficient of thermal expansion ("CTE") greater than that of the shell 20. The outer shell 20 comprises a degradable material such as a controlled electrolytic metallic material like IN-Tallic™ degradable material commercially available from BHGE in Houston Tex., or may comprise aluminum, magnesium, zinc, steel and combinations including at least one of the foregoing. The substance 22 may include aluminum, magnesium, gallium, copper, lithium, mercury, polymer composites, Polyvinyl Chloride (PVC), water, salt water, gasoline, turpentine, diesel, glycerin, ethanol, rubber compounds, rock salt, epoxies, thermoplastics, natural waxes, paraffin waxes, polyethylene waxes and combinations including at least one of the foregoing. Creation of the object 10 may be chemically by additive manufacture, plating of the shell 20 around the substance 22, fusing or adhering the two hemispheres around the shell, or mechanically by screwing two hemispheres or other plurality of parts of the shell 20 together around the substance 22, interference fitting the parts together, etc. At surface temperatures, the degradable object 10 is stable; at higher temperatures the greater thermal expansion of the substance 22 will cause rupture of the shell 20 or otherwise cause access to an inside surface 21 of the shell 20 rather than only an outside surface 23 of the shell 20 to enhance degradation thereof in various embodiments. The object 10 is configured with the substance 22 such that the substance 22 initially provides structural stability to the object 10 since the substance 22 is contained therewithin. Hence, even though the object shell 20 is of a thinner material radially due to it being hollow, it still retains the structural integrity to withstand the pressure differential across the object 10 when on its seat 12 and pressured against. This force is primarily a compressive force on the object. Conversely, the force placed on the object 10 from within due to the coefficient of thermal expansion differential in the substance 22 disposed inside the object 10 which is an expansion force can much more easily be the harbinger of destruction of the object 10.

Figure 3:
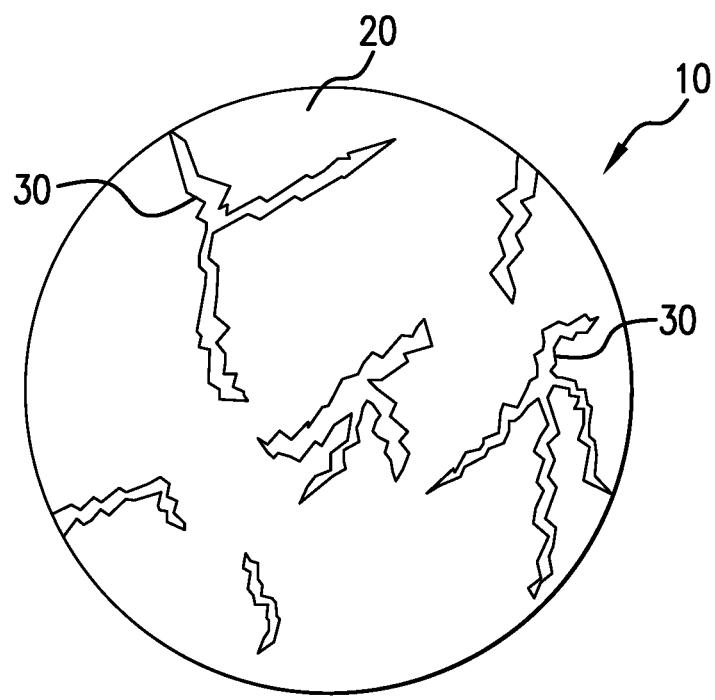
FIG. 3 is an alternate embodiment of the object.
Figure 4:
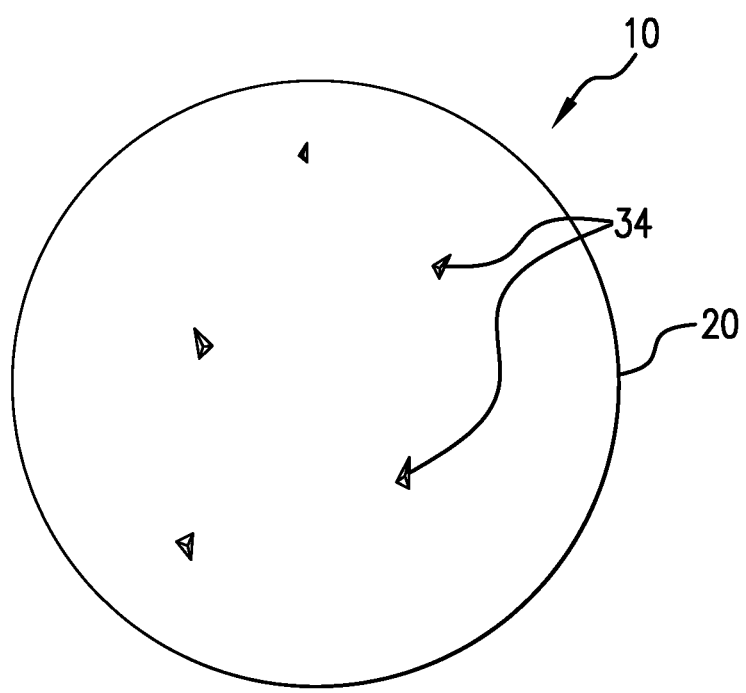
FIG. 4 is an alternate embodiment wherein stress risers are included in the object.

In FIG. 2, a rupture panel 24 (one or more) is disposed in the shell 20. The rupture panel 24 may be a disk disposed in a threaded opening 26 and retained in place with an externally threaded ring 28. The panel 24 may also be simply a section of the shell 20 that is thinner, weaker, more rapidly degrading, etc. than the rest of the shell 20 and may be affixed to the rest of the shell with fusion, adhesive, threads, interference fit, etc. or may even be formed together with the shell as in additive manufacture. During manufacture or otherwise prior to filling the shell 20 with substance 22 (filling could also be done on location if a manually closable configuration is used for the shell or disk), a determination would be made as to what the temperature will be where the object 10 will be put to use (i.e. on a seat at a particular depth in a borehole for example) such that an appropriate substance 22 may be selected. By appropriate substance, it is meant a substance with a coefficient of thermal expansion (CTE) that at the anticipated temperature where the object 10 will be used will result in an actual expansion of the substance 22 sufficiently larger than the expansion of the shell 20 that the expanded volume of the substance 22 will result in rupture the shell or in the case of the FIG. 2 embodiment rupture of the disk 24 and subsequent escape of the substance 22 or at least ingress of local fluids through the ruptured disk 24 (or other rupture of the shell 20, see FIG. 3 with cracks 30 caused by the expansion of substance 22 and FIG. 4 where the shell also includes stress risers 34 so that cracks begin more easily) to expose the inside surface of the shell 20 to the local fluids. It is to be understood that "local fluids" may refer to whatever fluid happens to be a the location of the seat 12 if the shell is degraded by that fluid or it may be a specific degratory fluid that is pumped to that location at a desired time (a slug or pill). Access to the inside surface 21 of the local fluid will substantially increase degradation of the shell 20 over exposure to local fluids from only the outer surface of the shell 20 due primarily to the greater exposed surface area. In embodiments where the shell 20 is fractured into many pieces due to the expansion of the substance 22, even more surface area is exposed and individual fractured pieces of the shell 20 will more rapidly become small enough for transport through entrainment with flowing fluid (circulation, reverse circulation, etc.). Alternatively, even if the shell 20 does not rupture and the substance 22 simply escapes the shell 20 while leaving the shell 20 otherwise intact, that shell is substantially structurally degraded since the support it originally had from the substance 22 is gone. The shell 20 will be easier to push through the seat 12 in such condition.

In embodiments, it may be desirable to weight the object 10 such that it will land in a particular orientation of the seat 12 such that configurations related to escape of the substance 22 are in a position that will allow escape rather than inadvertently in a position directly opposed to the seat 12 where escape of substance 22 would be hindered or prevented.

It will be understood that temperatures, in a borehole for example, are moderated by the circulation of fluid. The fluid circulation is occurring while an object 10 is traveling to a seat 12. Therefore the temperature of the object 10 will be relatively low during this time and the CTE of the substance 22 is not yet dispositive. After the object 10 lands on the seat 12, the circulation of fluid will stop. The pressure operation will take place at that time but also the temperature of the formation will slowly be increasing the temperature of the local fluid about the object 10. When that fluid if hot enough to cause the substance 22 to expand beyond the capability of the shell 20 to contain the substance 22 then rupture occurs, whether that be a panel 24, the shell 20 itself, etc. And such may be engineered to occur more quickly if the shell includes areas of more rapidly degrading material incorporated therein as those areas would already have started to n by the time the substance expands or the stress risers illustrated in FIG. 4.

It is also to be understood that combinations of individual features of the various embodiments disclosed herein are contemplate Set forth below are some embodiments of the foregoing disclosure:

Embodiment 1: A degradable object including a shell comprising a degradable material, a substance disposed at least partially within the shell, the substance having a coefficient of thermal expansion greater than a coefficient of thermal expansion of the shell.

Embodiment 2: The object as in any prior embodiment wherein the substance is a fluid.

Embodiment 3: The object as in any prior embodiment wherein the substance is a solid.

Embodiment 4: The object as in any prior embodiment wherein the substance is a mixture.

Embodiment 5: The object as in any prior embodiment wherein the substance comprises aluminum, magnesium, gallium, copper, lithium, mercury, polymer composites, Polyvinyl Chloride (PVC), water, salt water, gasoline, turpentine, diesel, glycerin, ethanol, rubber compounds, rock salt, epoxies, thermoplastics, natural waxes, paraffin waxes, polyethylene waxes and combinations and combinations including at least one of the foregoing.

Embodiment 6: The object as in any prior embodiment wherein the degradable material is a controlled electrolytic metallic material.

Embodiment 7: The object as in any prior embodiment wherein the shell includes a plurality of pieces.

Embodiment 8: The object as in any prior embodiment wherein the pieces are hemispherical.

Embodiment 9: The object as in any prior embodiment wherein the pieces are mechanically connectable to one another.

Embodiment 10: The object as in any prior embodiment wherein the pieces are chemically connectable to one another.

Embodiment 11: The object as in any prior embodiment wherein the shell includes a rupture panel.

Embodiment 12: The object as in any prior embodiment wherein the rupture panel is a separate component attached to the shell.

Embodiment 13: The object as in any prior embodiment wherein the rupture panel is a more easily degradable portion of the shell.

Embodiment 14: The object as in any prior embodiment wherein the shell includes stress risers therein.

Embodiment 15: The object as in any prior embodiment wherein the substance causes parting of at least a portion of the shell.

Embodiment 16: The object as in any prior embodiment wherein the substance escapes the shell while leaving the shell substantially intact and inwardly unsupported.

Embodiment 17: The object as in any prior embodiment wherein the object is weighted to encourage landing in a seat in a selected orientation.

The use of the terms "a" and "an" and "the" and similar referents in the context of describing the invention (especially in the context of the following claims) are to be construed to cover both the singular and the plural, unless otherwise indicated herein or clearly contradicted by context. Further, it should be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The teachings of the present disclosure may be used in a variety of well operations. These operations may involve using one or more treatment agents to treat a formation, the fluids resident in a formation, a wellbore, and/or equipment in the wellbore, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

What is claimed is:

1. A degradable object comprising:
a shell comprising a degradable material;
a substance disposed at least partially within the shell, the substance having a coefficient of thermal expansion greater than a coefficient of thermal expansion of the shell.

2. The object as claimed in claim 1 wherein the substance is a fluid.

3. The object as claimed in claim 1 wherein the substance is a solid.

4. The object as claimed in claim 1 wherein the substance is a mixture.

5. The object as claimed in claim 1 wherein the substance comprises aluminum, magnesium, gallium, copper, lithium, mercury, polymer composites, Polyvinyl Chloride (PVC), water, salt water, gasoline, turpentine, diesel, glycerin, ethanol, rubber compounds, rock salt, epoxies, thermoplastics, natural waxes, paraffin waxes, polyethylene waxes and combinations and combinations including at least one of the foregoing.

6. The object as claimed in claim 1 wherein the degradable material is a controlled electrolytic metallic material.

7. The object as claimed in claim 1 wherein the shell includes a plurality of pieces.

8. The object as claimed in claim 7 wherein the pieces are hemispherical.

9. The object as claimed in claim 7 wherein the pieces are mechanically connectable to one another.

10. The object as claimed in claim 7 wherein the pieces are chemically connectable to one another.

11. The object as claimed in claim 1 wherein the shell includes a rupture panel.

12. The object as claimed in claim 11 wherein the rupture panel is a separate component attached to the shell.

13. The object as claimed in claim 11 wherein the rupture panel is a more easily degradable portion of the shell.

14. The object as claimed in claim 1 wherein the shell includes stress risers therein.

15. The object as claimed in claim 1 wherein the substance causes parting of at least a portion of the shell.

16. The object as claimed in claim 1 wherein the substance escapes the shell while leaving the shell substantially intact and inwardly unsupported.

17. The object as claimed in claim 1 wherein the object is weighted to encourage landing in a seat in a selected orientation.

* * * * *